(12) United States Patent
Stratico et al.

(10) Patent No.: US 7,017,850 B2
(45) Date of Patent: Mar. 28, 2006

(54) WIRE MANIPULATOR METHODS AND APPARATUS FOR DYNAMO-ELECTRIC MACHINE COIL WINDING

(75) Inventors: Gianfranco Stratico, Siena (IT); Maurizio Mugelli, Siena (IT)

(73) Assignee: ATOP S.p.A., Florence (IT)

( * ) Notice: Subject to any disclaimer, the term of this patent is extended or adjusted under 35 U.S.C. 154(b) by 0 days.

(21) Appl. No.: 10/713,927

(22) Filed: Nov. 13, 2003

(65) Prior Publication Data

US 2004/0140388 A1    Jul. 22, 2004

Related U.S. Application Data

(60) Provisional application No. 60/426,463, filed on Nov. 14, 2002.

(51) Int. Cl.
*H02K 15/08* (2006.01)

(52) U.S. Cl. ............................ 242/432.3; 242/432.5; 242/439.1; 242/443; 29/596

(58) Field of Classification Search ............ 242/432.1, 242/432.2, 432.3, 432.4, 432.6, 443, 445.1, 242/439.1; 29/596
See application file for complete search history.

(56) References Cited

U.S. PATENT DOCUMENTS

| | | | |
|---|---|---|---|
| 2,949,789 A * | 8/1960 | Eminger | 74/23 |
| 4,858,835 A | 8/1989 | Luciani et al. | 242/1.1 A |
| 4,997,138 A | 3/1991 | Luciani et al. | 242/7.03 |
| 5,065,503 A | 11/1991 | Luciani et al. | 29/735 |
| 5,233,751 A | 8/1993 | Luciani et al. | 29/736 |
| 5,392,506 A | 2/1995 | Luciani et al. | 29/596 |
| 5,413,289 A | 5/1995 | Santandrea et al. | 242/1.05 |
| 5,732,900 A * | 3/1998 | Burch | 242/432.5 |
| 5,826,774 A | 10/1998 | Dell'Aglio et al. | 226/44 |
| 5,860,615 A * | 1/1999 | Burch | 242/432.5 |
| 5,988,554 A * | 11/1999 | Taka | 242/433.1 |
| 6,003,805 A * | 12/1999 | Newman | 242/432.5 |
| 6,098,912 A | 8/2000 | Noji | 242/432.5 |
| 6,254,027 B1* | 7/2001 | Kunou | 242/432.4 |
| 6,533,208 B1 | 3/2003 | Becherucci et al. | 242/432.4 |
| 6,626,392 B1* | 9/2003 | Kajita | 242/432.6 |
| 6,745,973 B1* | 6/2004 | Burch | 242/432.3 |
| 6,749,144 B1* | 6/2004 | Komuro et al. | 242/432.5 |
| 2002/0047065 A1* | 4/2002 | Kajita | 242/432 |
| 2002/0088892 A1* | 7/2002 | Komuro et al. | 242/432.3 |
| 2003/0168547 A1* | 9/2003 | Komuro et al. | 242/432.5 |

FOREIGN PATENT DOCUMENTS

| | | |
|---|---|---|
| WO | WO 00 73865 | 12/2000 |
| WO | WO 01 50580 | 7/2001 |

* cited by examiner

*Primary Examiner*—Kathy Matecki
*Assistant Examiner*—Evan Langdon
(74) *Attorney, Agent, or Firm*—Fish & Neave IP Group of Ropes & Gray LLP; Robert R. Jackson; Patrick J. Zhang

(57) ABSTRACT

The present invention concerns solutions for disposing the wire leads of a wire coil along trajectories that have predetermined positional references relative to the dynamo-electric machine component. The present invention proposes to provide a wire lead manipulator that operates to dispose the wire lead by entering within extremely narrow gaps on a dynamo-electric machine component at high speed and with a lower risk of the wire lead manipulator colliding with the accessory parts of the component. Using the solutions of this invention, these achievements are possible for dynamo-electric machine components with very small spaces between accessory components that do not allow the passage of conventional wire lead manipulator apparatus.

28 Claims, 9 Drawing Sheets

WIRE MANIPULATOR METHODS AND APPARATUS FOR DYNAMO-ELECTRIC
MACHINE COIL WINDING

CROSS REFERENCE TO RELATED APPLICATION

This application claims the benefit of priority from U.S. provisional patent application No. 60/426,463, filed Nov. 14, 2002, which is hereby incorporated by reference herein in its entirety.

BACKGROUND OF THE INVENTION

The present invention concerns improved methods and apparatus for winding and termination of wire coils that are required in components of dynamo-electric machines. In particular, the present invention concerns solutions for disposing the wire lead of a wire coil along a trajectory that has predetermined positional references relative to the dynamo-electric machine component.

Modern dynamo-electric machine components require disposition of the wire leads on the component along trajectories that incorporate significant changes of direction. Furthermore, an increasingly limited space is made available proximate to the dynamo-electric machine component for the presence and movement of wire lead manipulators configured to accomplish this task. The space available on a component is particularly limited for a portion of the traditional wire lead manipulator that engages the wire leads and places them along the trajectories. This space limitation is mainly caused by the presence of numerous structural accessories on the component and the high number of trajectories that are required in the limited dimensions of the component.

The present invention proposes to provide a wire lead manipulator that operates to dispose wire leads on a dynamo-electric machine component by entering within extremely narrow gaps on the component at high speed and with a lower risk of the wire lead manipulator colliding with the accessory parts of the component. Using the solutions of this invention, these achievements are possible for dynamo-electric machine components with very small spaces between accessory components (e.g., small gaps between pegs placed on a terminal board that do not allow the passage of conventional wire lead manipulator apparatus.

These and other objects of the present invention will be more apparent in view of the following drawings and detailed description of the preferred embodiments.

BRIEF DESCRIPTION OF THE DRAWINGS

Non-limiting embodiments of the present invention are described hereinafter with reference to the accompanying drawings in which.

DETAILED DESCRIPTION OF THE PREFERRED EMBODIMENTS

The solutions of the present application are generally related to those described in Luciani et al. U.S. Pat. No. 5,065,503 and Luciani et al. U.S. Pat. No. 5,233,751, both of which are hereby incorporated by reference herein in their entireties.

Figure 1:
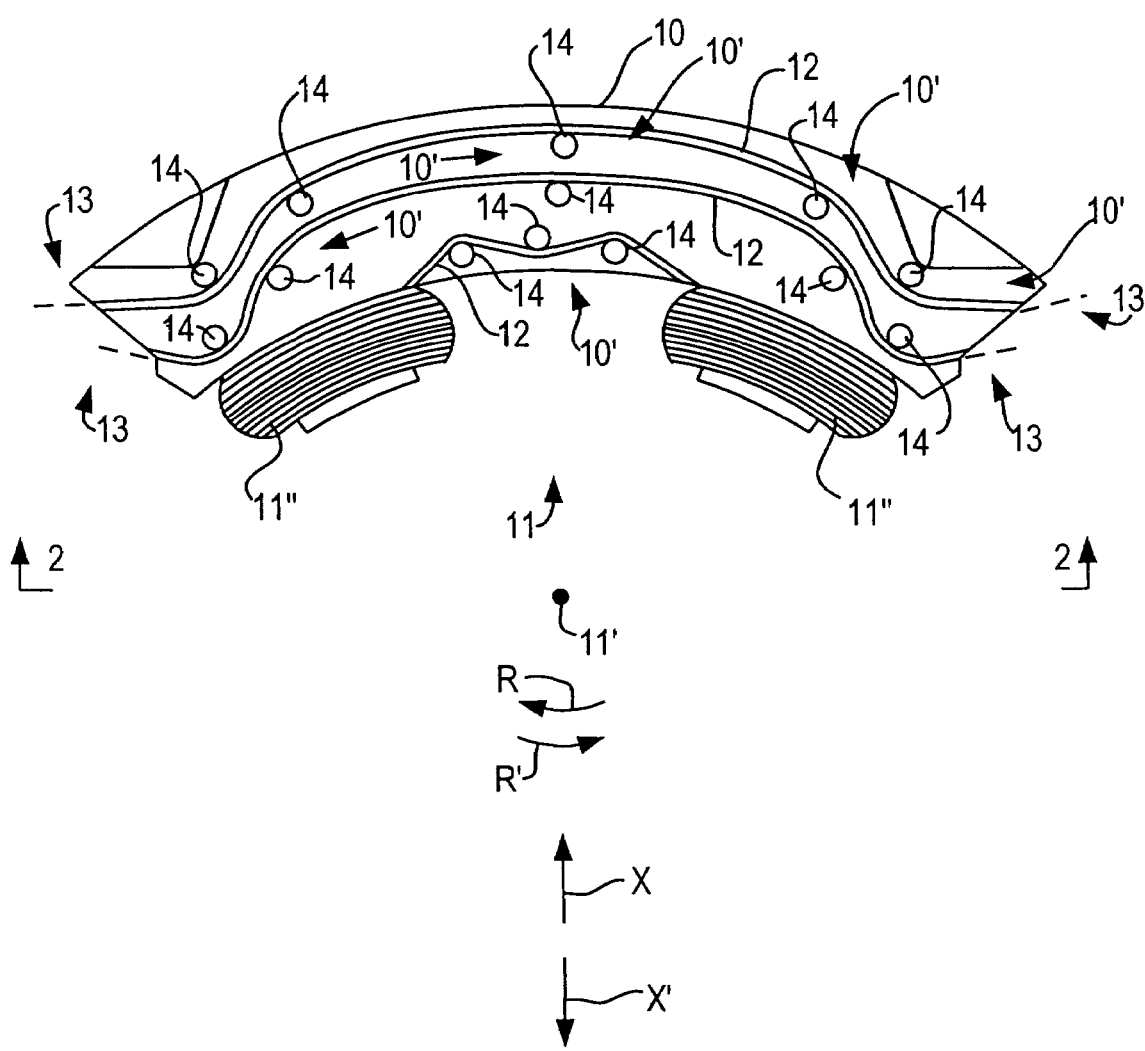
FIG. 1 is a schematic partial view of terminal board 10 of stator 11 which shows wire leads 12 disposed along trajectories 13 in accordance with the present invention.

FIG. 1 is a schematic partial view of terminal board 10 of stator 11 which shows wire leads 12 disposed along trajectories 13 in accordance with the present invention. Also shown in FIG. 1 are adjacent wire coils 11" which have been wound onto stator 11. The central bore of stator 11 may possess longitudinal axis 11', which is represented as an intersection point in FIG. 1.

Terminal board 10, as shown in FIG. 1, may not provide sufficient space for a traditional wire lead manipulator (e.g., as described in the previously cited Luciani et al. U.S. patents) to move in areas like 10' to dispose the wire leads on trajectories 13. The limitations of space may be caused by the vicinity of pegs 14, around which the wire leads are to be coursed in order to be disposed on trajectories 13. The vicinity of pegs 14 may lead to collisions between a peg and the end portion of a traditional wire lead manipulator, which may be required to serve as a wire source and to move in the directions of the trajectory to dispose the wire lead.

Figure 2:
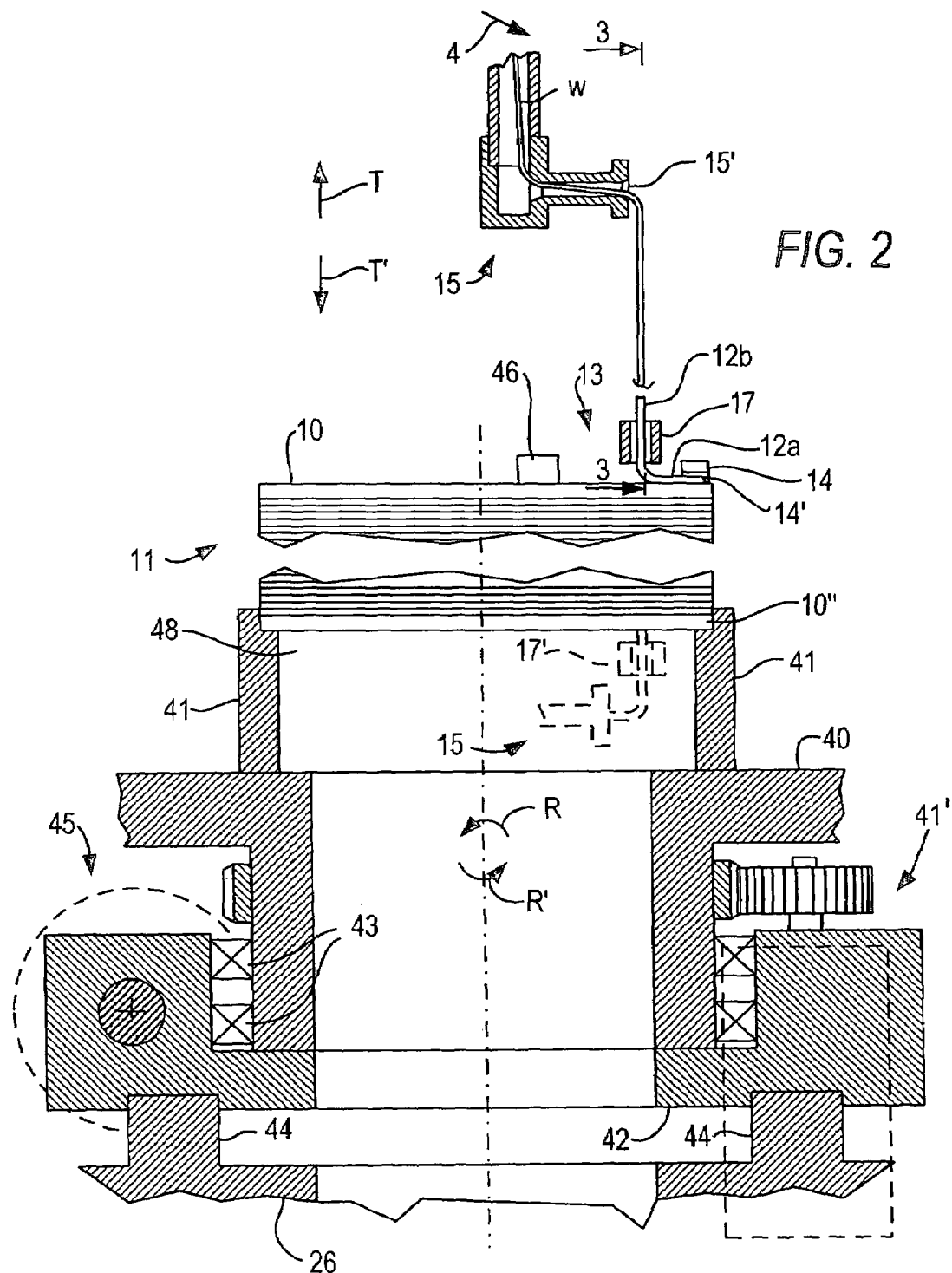
FIG. 2 is a schematic sectional view from direction 2—2 of FIG. 1 which shows some principal parts of the apparatus in accordance with one embodiment of the present invention.

FIG. 2 is a schematic sectional view from direction 2—2 of FIG. 1 showing some principal parts of the apparatus of the present invention. Note that FIG. 2 shows a condition of wire lead disposition prior to the condition shown FIG. 1, which shows the wire leads already placed in their trajectories on the terminal board. For sake of clarity, stator 11 in FIG. 2 is not shown in cross section.

As illustrated in FIG. 2, needle member 15 represents a portion of a winding needle that may be used to wind a coil of the stator with wire W. Needle member 15 may be translated in directions T and T' to wind a coil of the stator with wire W. Furthermore, relative rotations in directions R and R' around axis 11' and relative translations in directions X and X' with respect to axis 11' (see FIG. 1) may also be provided between needle member 15 and stator 11 in order to wind and stratify wire W onto the poles of stator 11 to form a coil. Translation in directions X and X' with respect to axis 11' may also be referred to generally as radial stratification.

Wire W may be delivered from outlet 15' of needle member 15 during movements in some or all of directions T, T', X, X', R and R' in order to properly locate wire W around the poles of stator 11 during winding of a coil. The use of movements in directions T, T', X, X', R and R' for winding of the coils, together with the details of needles like needle member 15 have been described in Luciani et al. U.S. Pat. No. 4,858,835, Santandrea et al. U.S. Pat. No. 5,413,289, and Becherucci et al. U.S. Pat. No. 6,533,208, all of which are hereby incorporated by reference herein in their entireties.

As shown in FIG. 2, stator 11 may be caused to rotate in directions R and R' around its bore axis 11' by supporting stator 11 on table 40 (through columns 41) and rotating table 40 in directions R and R' around axis 11'. Rotation of table 40 in directions R and R' may be driven by motor gear unit 41'. Table 40 may be supported for rotation in directions R and R' by means of bearings 43 assembled on table 42. Table 42 may be translated in directions X and X' (into and out of the page containing FIG. 2) by being mounted on guides 44 of frame 26. Motor screw unit 45 may be used to drive the translation of table 42 in directions X and X' atop guides 44.

FIG. 2 represents an instant in which wire lead 12 is being disposed along predetermined trajectory 13 on terminal board 10. More particularly, portion 12a of the wire lead has already been disposed on a first portion of trajectory 13 whilst portion 12b of wire lead 12 has yet to be disposed on the trajectory. Wire lead portion 12b will be disposed on a further portion of trajectory 13 at a later time in the wire lead disposition process.

As shown in FIG. 2, guide member 17 is located between wire outlet 15' and terminal board 10 of stator 11 and at a predetermined distance from terminal board 10. In order to draw wire W from needle member 15 and to dispose portions of the wire lead on trajectory 13, stator 11 may be rotated in directions R or R', or translated in direction X and X'. For example, with reference to FIG. 2, stator 11 may be further rotated in direction R/R' or further translated in direction X/X' to dispose the wire lead on a further portion of trajectory 13. Also, needle member 15 and guide member 17 may be further translated in direction T to cause the wire lead to climb onto terminal receptacle 46. If the trajectory requires wire lead deviations which can be obtained with translations in directions X and X' (i.e., radial stratification), then table 42 may supply such translations by means of motor screw unit 45. If the trajectory requires wire lead deviations which can be obtained with rotations in directions R and R', then table 40 may supply such rotation by means of rotation supported by bearings 43.

These translational and rotational movements may be appropriately sequenced and combined by a control system like those described in the previously incorporated references to ' obtain a wire lead trajectory with the desired predetermined positional references. Sequencing and combination of the movements may be dependent on the spatial coordinates of the wire lead trajectory. During these movements, guide member 17 constrains the exit of wire W, which results in the disposition of wire W onto terminal board 10 with a predetermined location and direction with respect to stator 11. Simultaneously, guide member 17 allows the passage of wire W from needle member 15 to stator 11 in order to dispose the wire leads on trajectories 13.

The wire leads disposed according to the above principles may originate from wire coils that are already present on stator 11, or from an initial attachment point on stator 11 where wire W may be anchored prior to the winding of a coil. The wire leads disposed according to the above principles may flow from a wire lead source like needle member 15, or from a terminal attachment point where wire W may be anchored away from stator 11 following the completion of a coil. Therefore, it should be understood that the present invention may be used to dispose a wire lead at the beginning of a wire coil or to terminate a wire lead at the end of a coil and may be used with any of the above-mentioned wire lead sources or any other type of wire lead source. The previously described translational and rotational movements pull wire W from needle member 15 and through guide member 17 to dispose the wire lead on trajectory 13. A wire tensioner like that described in Dell'Aglio et al. U.S. Pat. No. 5,826,774, which is hereby incorporated by reference herein in its entirety, may be used to tense the wire during movements in directions T, T', X, X', R and R'. The distance of guide member 17 from stator 11 may be predetermined during the translational and rotational movements in order to accurately dispose the wire leads along trajectory 13. Wire guide member 17 may be extremely near to stator 11 in those areas where there is little available space for operation of a traditional wire lead manipulator.

As will be more apparent from the following, a distal end of guide member 17 which is most proximate to stator 11 during disposition of the wire lead may be of an extremely small dimension compared with the dimensions of the rest of guide member 17 or needle member 15. This feature of the present apparatus allows the wire lead to be guided and disposed in directions T, T', X, X', R and R' within areas of limited space near stator 11. Furthermore, guide member 17 may be free from any structure that may present a source of interference with respect to stator 11. As a result, for example, a distal end of guide member 17 may enter into the confined spaces close to the surface of terminal board 10, where pegs 14 and other similar structures may present a source of interference, and dispose the wire leads within seat 14' carved into pegs 14.

Prior to disposing the wire lead on trajectory 13, guide member 17 first receives a portion of wire W that extends from wire outlet 15' to stator 11. Once the portion of wire W has been received by guide member 17, the operational situation of the apparatus is similar to that shown in FIG. 2.

Figure 3:
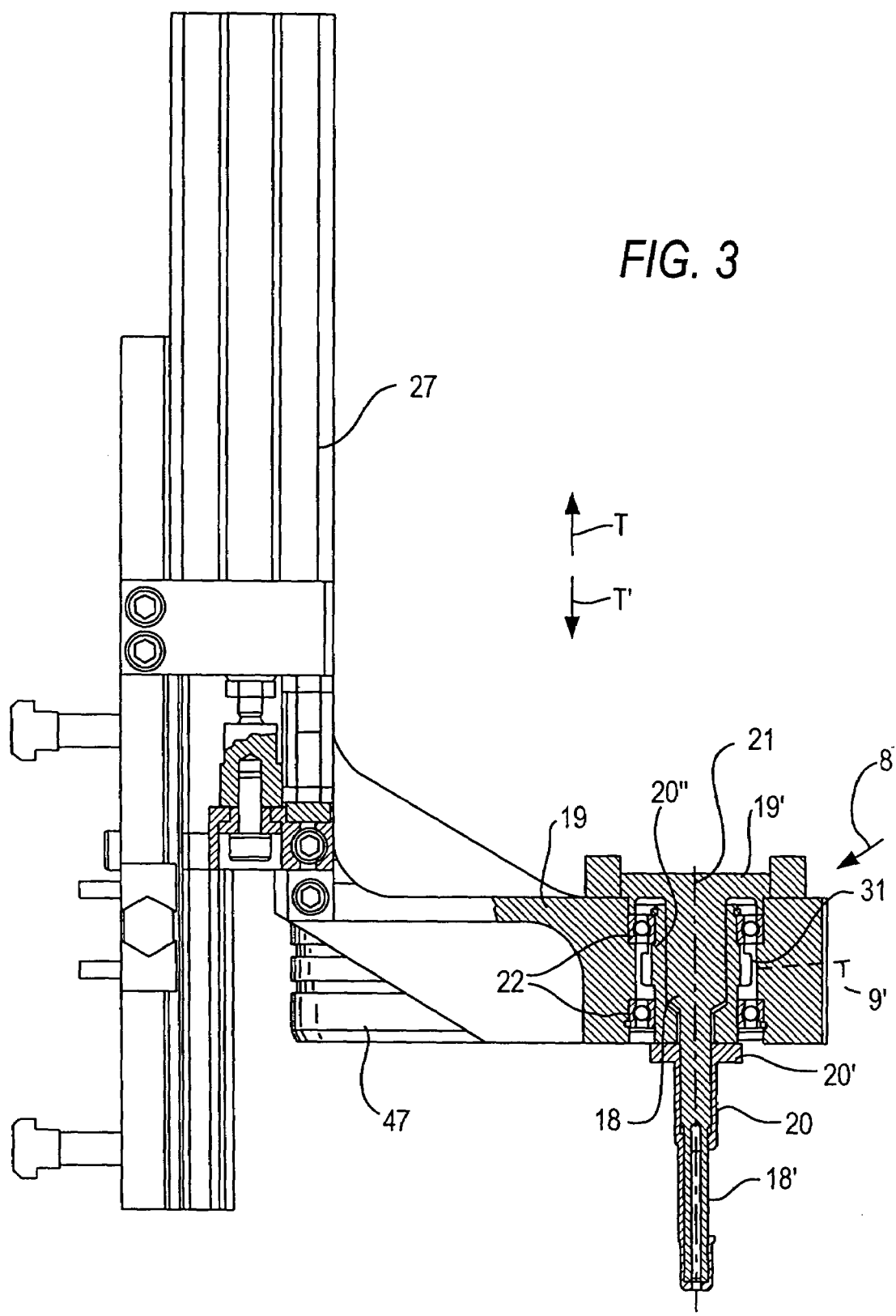
FIG. 3 is a partial sectional view from direction 3 of FIG. 2 which shows the constructional details of guide member 17 and certain operational principles thereof in accordance with one embodiment of the present invention.

FIG. 3 is a partial sectional view from direction 3 of FIG. 2 that illustrates the constructional details of guide member 17 according to an embodiment of the present invention. For sake of clarity, some of the parts in FIG. 3 have not been shown with sectional hatching. As shown in FIG. 3, part of guide member 17 may be a first portion comprised of a longitudinal column member 18 joined to support plate 19 by means of flange 19' bolted to support plate 19. The lower portion of column member 18 may be a tubular portion 18'. Tubular portion 18' may be a partial cylinder that is sliced along its longitudinal axis and therefore open towards the viewer of FIG. 3.

Figure 4:
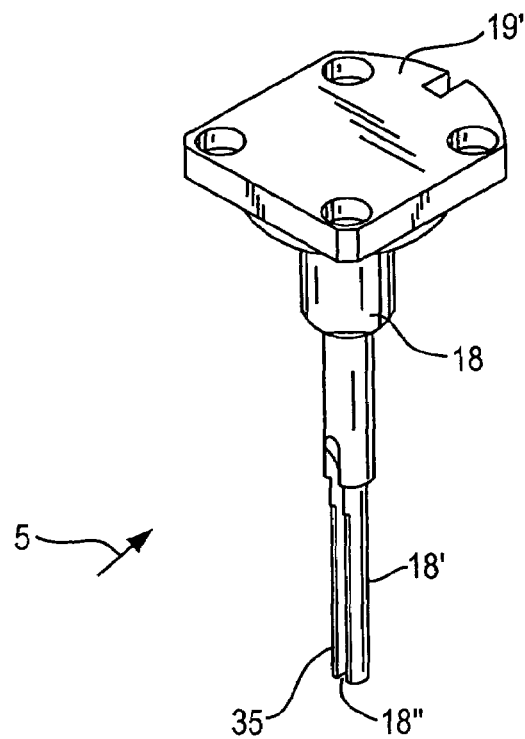
FIG. 4 is a perspective view from direction 4 of FIG. 2 which shows column member 18 disassembled from the assembly of FIG. 3 in accordance with one embodiment of the present invention.
Figure 5:
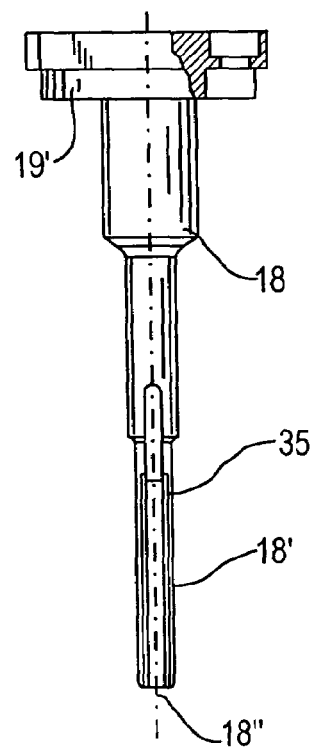
FIG. 5 is a side elevational view from direction 5 of FIG. 4 which further illustrates details of column member 18 in accordance with one embodiment of the present invention.

Column member 18 is also shown in more detail in FIG. 4, which is a perspective view of member 18 as seen from direction 4 of FIG. 2. FIG. 4 shows column member 18 by itself and disassembled from the assembly shown in FIG. 3. As shown in FIG. 4, tubular portion 18' is also open at its terminal end 18" (i.e., portion 18' is open toward stator 11 when it is assembled as shown in FIG. 3). FIG. 5 is a side elevational view from direction 5 of FIG. 4 that further illustrates the features of column member 18.

Returning to the illustration of FIG. 3, it is shown that guide member 17 has a second portion that comprises sheath member 20. Sheath member 20 may be of a tubular form that coaxially surrounds column member 18 when sheath member 20 is assembled in the assembly of FIG. 3. Flange portion 20' of sheath member 20 may be bolted to support ring 20", which may be supported inside bearings 22 of support plate 19. These assembly principles locate sheath member 20 coaxially surrounding column member 18. Sheath member 20 may be able to rotate around its longitudinal axis 21, which may be considered a commonly axis of reference for both column member 18 and sheath member 20.

Figure 6:
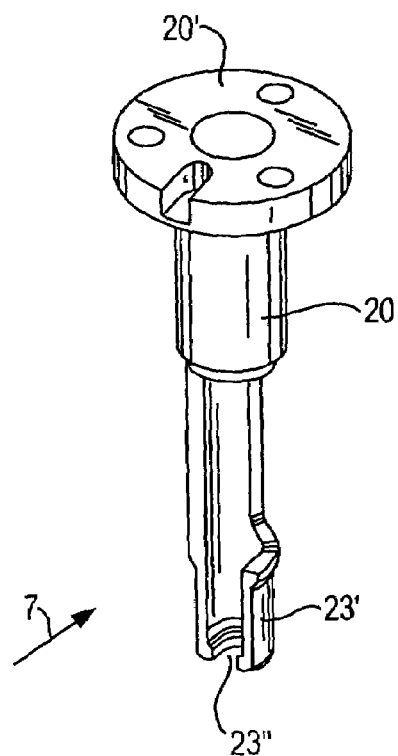
FIG. 6 is a perspective view, similar to that of FIG. 4, which shows sheath member 20 disassembled from the assembly of FIG. 3 in accordance with one embodiment of the present invention.

FIG. 6 is a perspective view like that of FIG. 4 (from direction 4 of FIG. 2), which shows sheath member 20 by itself and disassembled from the assembly of FIG. 3. Lower portion 23' of sheath member 20 may be of a cylindrical tubular form that is open at its terminal end 23". Within end 23", sheath member 20 may have an internal reinforcing rim portion.

Figure 7:
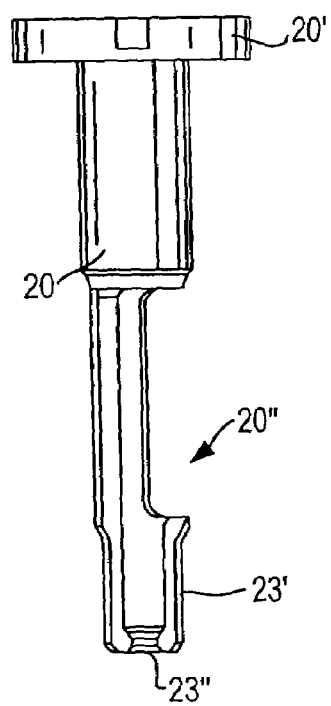
FIG. 7 is a side elevational view from direction 7 of FIG. 6 which further illustrates the details of sheath member 20 in accordance with one embodiment of the present invention.

FIG. 7 is a side view from direction 7 of FIG. 6 that further illustrates the features of sheath member 20. As shown in FIG. 7, sheath member 20 may have a cutout opening 20'". The reasons for the existence of opening 20'" will be more fully explained in the following with reference to the operation of needle member 15.

Figure 8:
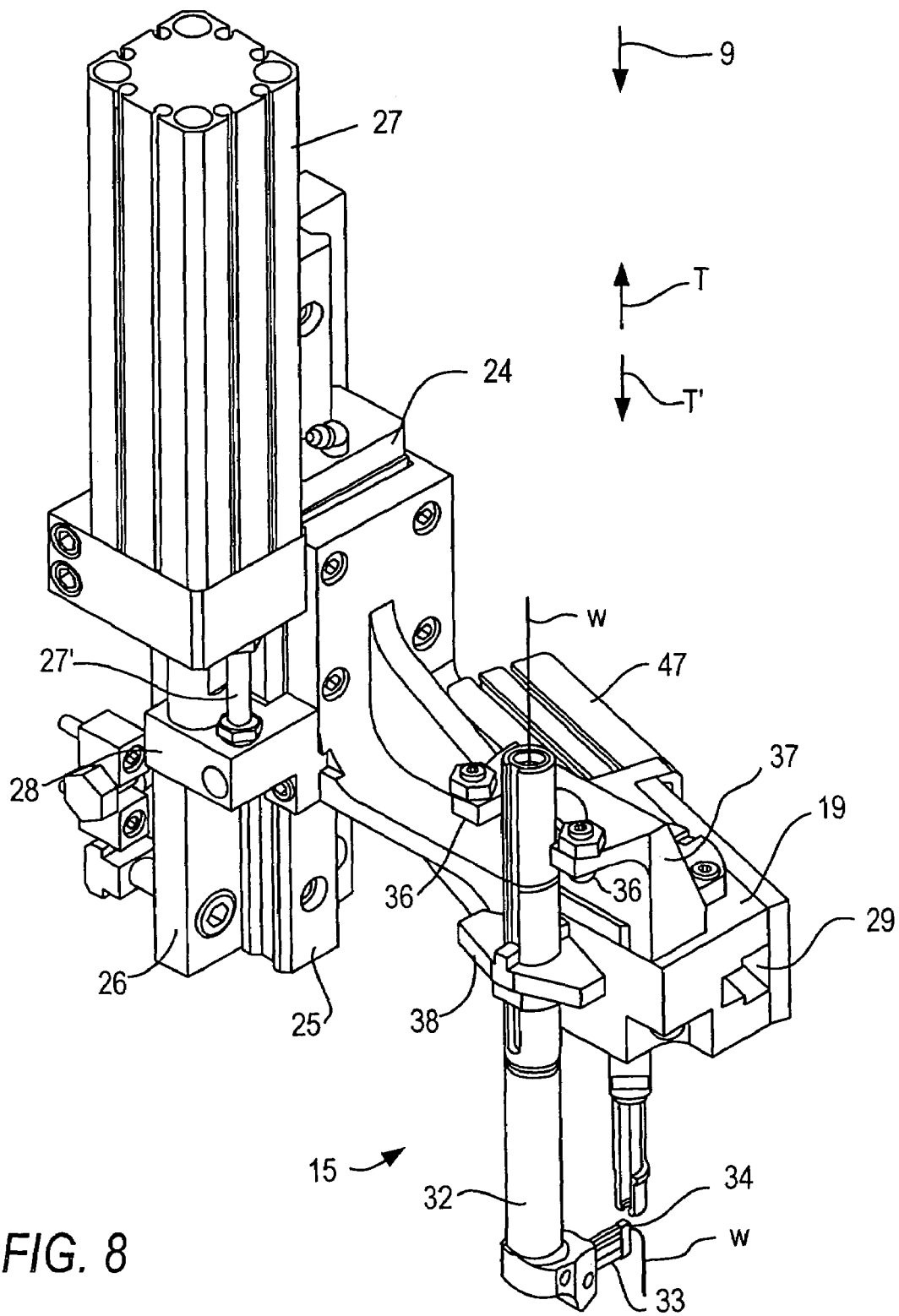
FIG. 8 is a perspective view from direction 8 of FIG. 3 which additionally shows an assembly representative of needle member 15 in accordance with one embodiment of the present invention.

FIG. 8 is a perspective view from direction 8 of FIG. 3 that includes an representative assembly of needle member 15 (in particular, elements 32, 33, 34 and 38 of FIG. 8). As shown in FIG. 8, support plate 19 is bolted to carriage 24. Carriage 24 may be capable of translation in directions T' and T along guide structure 25 of frame 26. Mechanical drive for this translational movement may be accomplished by means of air cylinder 27 assembled on frame 26. Rod 27' of air cylinder 27 is connected to an extension arm 28 that is affixed to support plate 19.

With reference to FIG. 8, needle member 15 (first show in FIG. 1) may consist of shaft 32 possessing substantially perpendicular extension 33. Wire W may run through shaft 32 and extension 33 in order to extend to stator 11 as shown in FIG. 2. Outlet 15' of FIG. 2 may correspond to an end opening of extension 33 as will be shown below in FIGS. 10–12.

Figure 9:
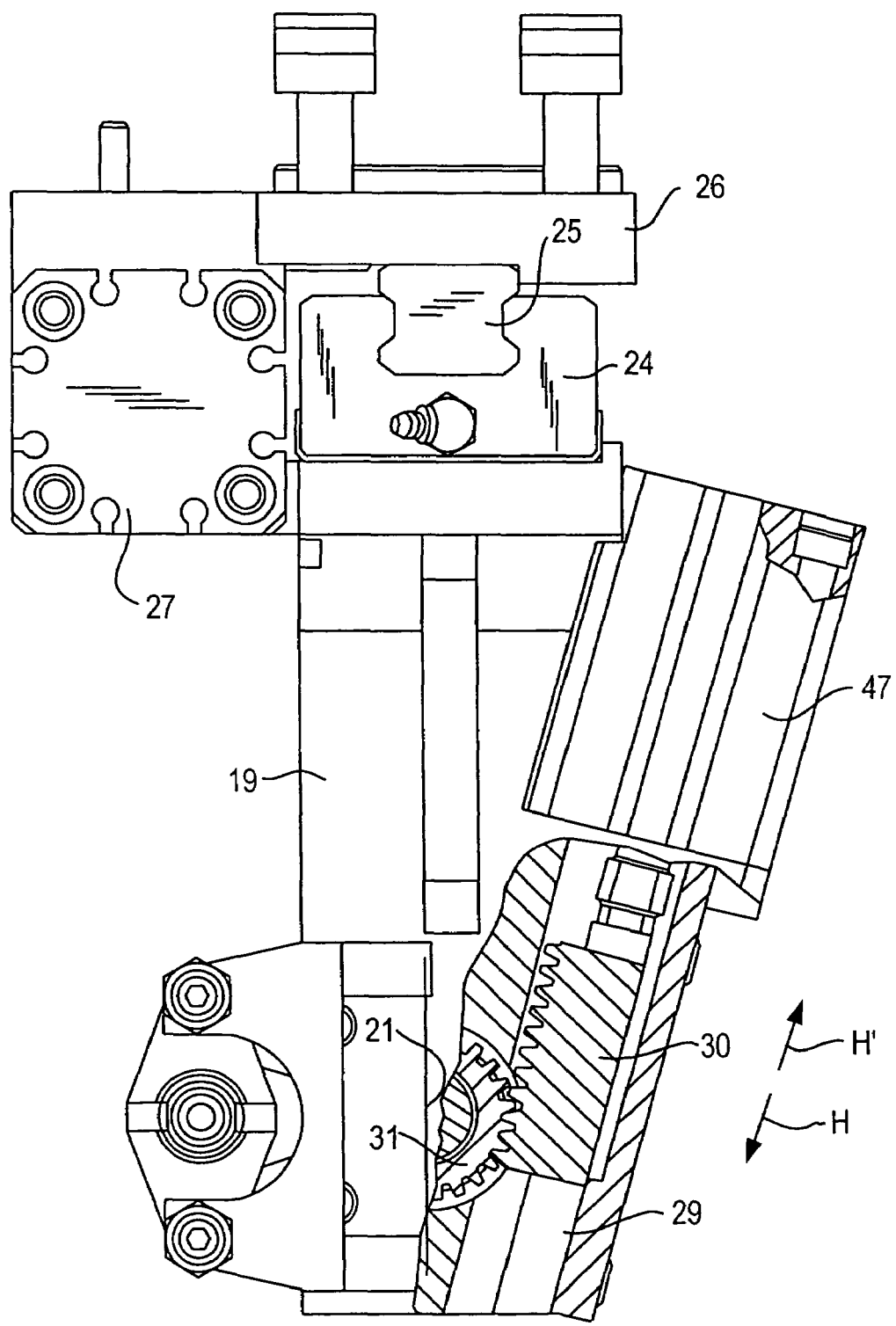
FIG. 9 is a partial sectional view taken from direction 9 of FIG. 8 and sectioned at level 9' of FIG. 3 which shows details of the actuation mechanism for sheath member 20 in accordance with one embodiment of the present invention.

FIG. 9 is a partial sectional view as seen from direction 9 of FIG. 8. The partial sectioning of FIG. 9 has been made at level 9' of FIG. 3. As shown in FIG. 9, support plate 19 includes corridor 29 in which rack member 30 is seated. Rack member 30 is engaged with gear 31 (see also FIG. 3), which surrounds and is fixed to support ring 20'. Corridor 29 may be disposed in a plane that is substantially perpendicular to axis 21 (as shown in FIGS. 3 and 9). The rod of air cylinder 47 may be connected to rack member 30. Air cylinder 47 may be supported by support plate 19. By actuating air cylinder 47, rack member 30 is caused to translate in directions H and direction H' within corridor 29. This translation of rack member 30 causes the rotation of sheath member 20 around axis 21. By rotating sheath member 20, the angular position (with respect to axis 21) of lower portion 23' may be controlled with respect to the lower portion of tubular portion 18'.

Once wire W is received within lower portion 18' of column 18, the presence of lower portion 23" in front of the opening in tubular portion 18' captures or engages wire W. This result has been shown with guide member 17 of FIG. 2, which engages the wire lead and disposes it onto terminal board 10 of stator 11 with a predetermined trajectory. In other words, the rotation of sheath member 20 may be used to align the angular position (with respect to axis 21) of lower portion 23' with that of the opening in lower tubular portion 18' and thereby capture or engage wire W within tubular portion 18'.

Figure 10:
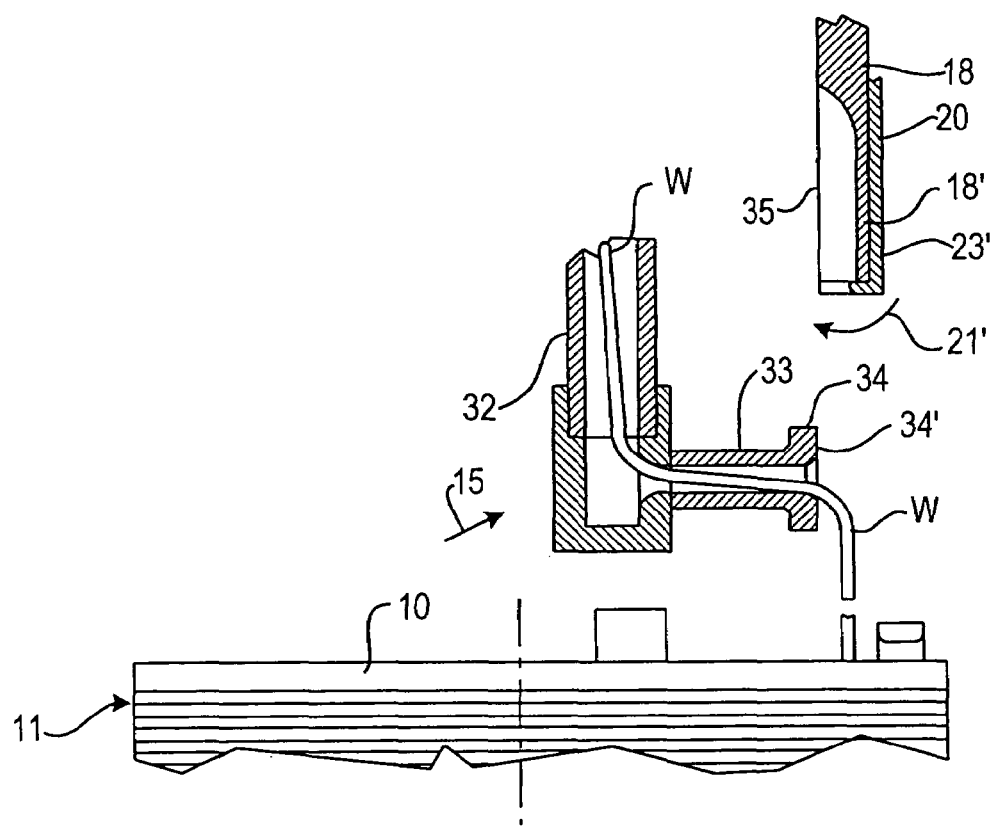
FIG. 10 is a schematic partial sectional view similar to the view of FIG. 2 which shows the operational configuration of the apparatus at an instant before wire W has been received within lower portion 18' in accordance with one embodiment of the present invention.

FIG. 10 is a schematic partial sectional view similar to the view shown in FIG. 2. With simultaneous reference to FIGS. 8 and 10, extension 33 of winding shaft 32 may possess flange portion 34 with face 34' where wire W leaves extension 33 to reach stator 11. Face 34' may also be understood to demark a plane at which wire W exits out of extension 33 or previously shown outlet 15' (see FIG. 2). In preparation for receiving wire W within tubular portion 18' of column member 18, face 34' may be aligned with plane 35 of column member 18. Plane 35, as also previously shown in FIGS. 4 and 5, may define a face of lower tubular portion 18' coinciding with the longitudinal opening in portion 18'. For example, plane 35 may define a face where tubular portion 18' has been cut to produce the longitudinal opening. In preparation for receiving wire W, column member 18 may be positioned so that plane 35 is substantially parallel to the plane of face 34'. This alignment of planes 35 and face 34' also corresponds to the alignment of lower portion 18' with the portion of wire W extending out of extension 33 to stator 11.

With reference to FIG. 10, it should be understood that when preparing to receive wire W, column member 18 and sheath member 20 are rotated with respect to each other so that the longitudinal opening in the side of lower portion 18' is aligned with the opening in the side of lower portion 23' so as to allow the entry of wire W into tubular member 18. In other words, lower portion 23' of sheath member 20 is rotated so that its angular position with respect to axis 21 is substantially diametrically opposite to that of the longitudinal opening in lower portion 18'.

Once planes 35 and face 34' are aligned, air cylinder 27 may be actuated to cause column member 18 to translate in direction T' along axis 21 so that wire W passes through terminal end openings 23" and 18" and into lower portion 18' of column member 18. The resultant operational configuration is shown in FIG. 11, which is a view similar to that of FIG. 10.

Figure 11:
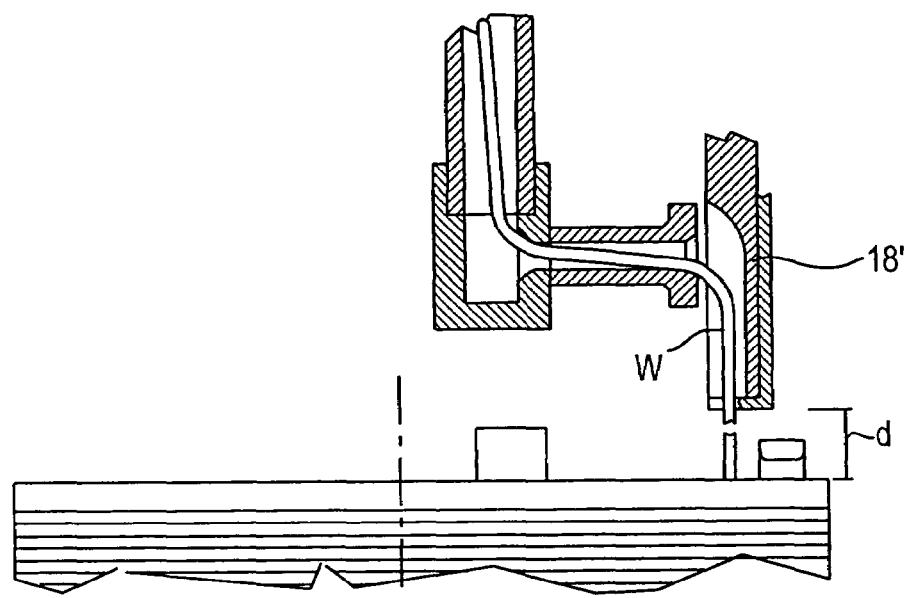
FIG. 11 is a schematic partial sectional view similar to the view of FIG. 2 which shows the operational configuration of the apparatus at an instant when wire W has been received within lower portion 18' but before sheath member 20 has captured wired W in accordance with one embodiment of the present invention.

As shown in FIG. 11, column member 18 may be translated in direction T' along axis 21 until column member 18 reaches predetermined distance d from stator 11. With reference to FIG. 8, predetermined distance d may be assured by causing registrable abutment members 36 of bracket 37 to abut against plate structure 38 fixed to winding shaft 32. Variations in distance d may be obtained by changing the position of winding shaft 32 and thereby changing the distance of plate structure 38 from stator 11. A controlled motor for obtaining translations T and T' of winding shaft 32 during winding may be set and actuated to position winding shaft 32 so that the distance of plate structure 38 from stator 11 enables guide member 17 to be placed at required distance d away from stator 11 when the wire lead disposition commences. As an alternative, and to avoid using the motor drive used for translations T and T' of winding shaft 32, a separate controlled motor unit may be used to translate support plate 19 in directions T and T' so that distance d is achieved.

Figure 12:
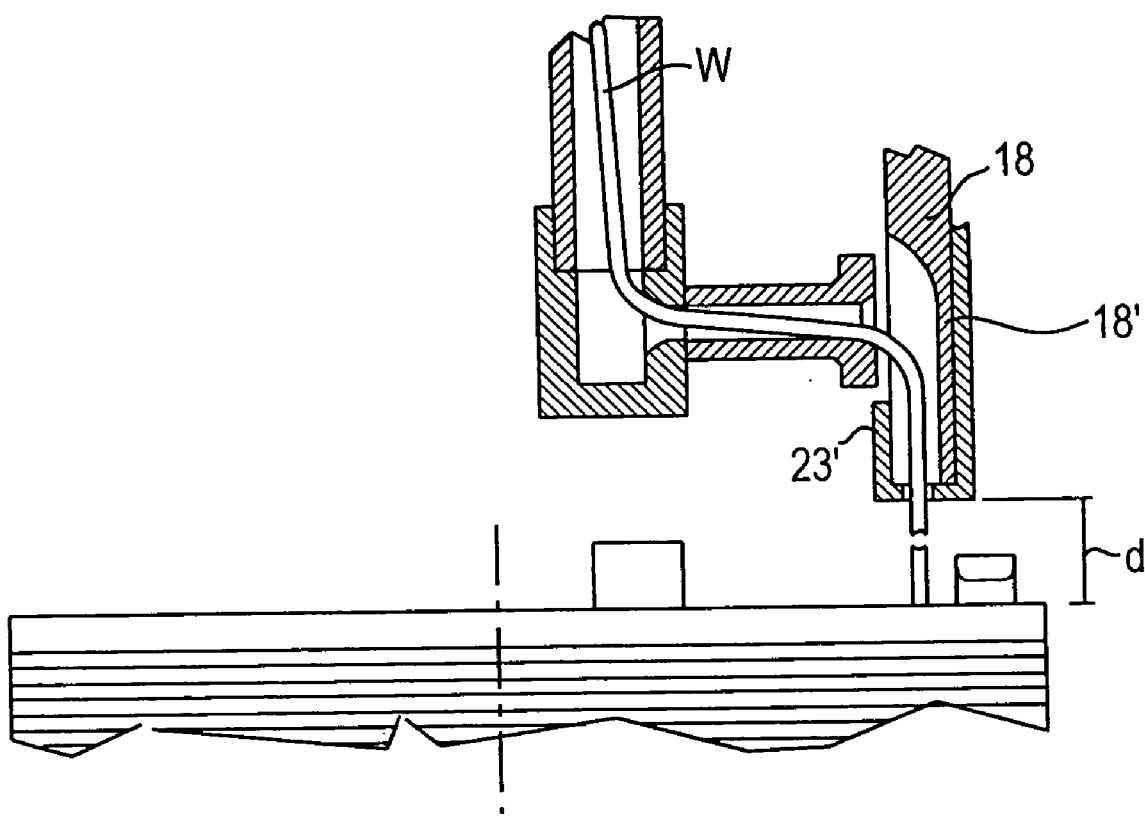
FIG. 12 is a schematic partial sectional view similar to the view of FIG. 2 which shows the operational configuration of the apparatus at an instant when wire W has been captured within lower portion 18' by sheath member 20 in accordance with one embodiment of the present invention.

Once column member 18 has reached a position distance d above stator 11, air cylinder 47 may be actuated to rotate sheath member 20 around axis 21 in order to align the angular position (with respect to axis 21) of lower portion 23' with the opening of tubular portion 18' to enclose, capture, and engage wire W within tubular portion 18'. The resultant operational configuration is shown in FIG. 12, which is a view similar to that of FIG. 10.

In other words, the lower portion 23' of sheath member 20, which comprises the part of sheath member 20 that is disposed below cutout portion 20', confronts the longitudinal opening in the lower tubular portion 18', thereby closing at least a lower part of the longitudinal opening. Cutout portion 20' serves to enable sheath member 20 to become disposed extremely proximate to flange portion 34 without collision or interference. It may also be possible for flange portion 34 to enter into the plane of cutout portion 20' in order to transfer wire W to tubular portion 18' without collision or interference.

At the conclusion of the wire transfer operation, wire W is enclosed, captured, and engaged within lower tubular portion 18' and lower portion 23' to fulfill the previously described wire disposition requirements. In particular, wire W may be guided for disposition on a desired trajectory that has predetermined positional references with relation to stator 11.

In view of the foregoing, it should be understood that a distal end of the wire lead manipulator that enters into a plane adjacent stator 11 to dispose the wire lead in the trajectory may comprise a terminal end of sheath member 20, column member 18, or both. FIGS. 10–12, which show a terminal end of sheath member 20 being disposed below the terminal end of inner column member 18, are for purposes of illustration only and should not be used to limit the distal end of the wire lead manipulator to the terminal end of sheath member 20. As an alternative to what is illustrated in FIGS. 10–12, the terminal ends of column member 18 and sheath member 20 may be at the same distance away from stator 11 as one another and therefore disposed in the same plane.

It should be understood that it is contemplated to dispose wire leads on a terminal board present on opposite side 10" of stator 11 (see FIG. 2). Like subject matter is described in Luciani et al U.S. Pat. No. 4,997,138, which is hereby incorporated by reference herein in its entirety. In the case of disposing wire leads on opposite side 10" of stator 11, needle member 15 may be translated in direction T' to present itself according to the dashed line representation shown in FIG. 2. Additional parts similar to members 18 and 20 described in the foregoing may access spacing 48 below the stator and may be similarly used to achieve guide member 17', which is shown in dashed line representation in FIG. 2. Guide member 17' may be configured and operated in a similar manner as previously described guide member 17 in order to dispose wire leads on a terminal board present on the opposite side 10" of stator 11.

Thus, improved systems and methods for disposing wire leads onto dynamo-electric machine components are provided. One skilled in the art will appreciate that the present invention can be practiced by other than the described embodiments, which are presented for the purpose of illustration and not of limitation.

What is claimed is:

1. An apparatus for disposing a wire lead along a trajectory having predetermined positional references relative to a dynamo-electric machine component comprising:
   a wire lead source;
   a wire lead manipulator having a longitudinal axis comprising first and second portions and configured to dispose the wire lead along the trajectory at the predetermined positional references, the predetermined positional references being located on a first plane substantially defined by a surface of the component, the first portion being configured to receive the wire lead from the wire lead source, the second portion being configured to engage the wire lead received within the first portion; and
   wherein a distal end of the wire lead manipulator exclusively enters the first plane to dispose the wire lead at each of the predetermined positional references along the trajectory by relative movement of the distal end in the first plane with respect to the predetermined position references.

2. The apparatus of claim 1 wherein the first plane is substantially perpendicular to the longitudinal axis.

3. The apparatus of claim 1 wherein the distal end of the wire lead manipulator comprises a terminal end of the second portion.

4. The apparatus of claim 1 wherein the first portion comprises a hollow longitudinal member having a first opening configured for receiving the wire lead within the hollow member.

5. The apparatus of claim 4 wherein the second portion comprises a rotatable sheath member disposed concentrically around the first portion, the sheath member having a second opening for allowing the wire lead to pass into the first opening, wherein the first and second openings are configured to be aligned with each other to receive the wire lead into the first portion.

6. The apparatus of claim 5 wherein the sheath member is configured to engage the wire lead by rotating the second opening out of alignment with the first opening.

7. The apparatus of claim 5 wherein the first and second openings are further configured to align with the wire lead source to receive the wire lead into the first portion.

8. The apparatus of claim 1 wherein the wire lead manipulator is configured to be disposed adjacent a second plane from which the wire lead source dispenses the wire lead to receive the wire lead, the second plane being substantially parallel to the longitudinal axis.

9. The apparatus of claim 8 wherein the wire lead manipulator is pressed against a portion of the wire lead source to receive the wire lead.

10. The apparatus of claim 1 wherein the wire lead manipulator is configured for relative rotation and substantially parallel translation with respect to a central axis of the dynamo-electric machine component that is substantially parallel to the longitudinal axis.

11. The apparatus of claim 10 wherein the wire lead manipulator is further configured for relative radial stratification with respect to the central axis.

12. The apparatus of claim 11 wherein the dynamo-electric machine component is disposed on a table that is configured to provide rotation and radial stratification with respect to the central axis.

13. The apparatus of claim 10 wherein the wire lead manipulator is configured for translation substantially parallel to the longitudinal axis.

14. The apparatus of claim 1 wherein the wire lead source is a wire dispensing needle configured to wind wire coils onto the dynamo-electric machine component.

15. A method for disposing a wire lead along a trajectory having predetermined positional references relative to a dynamo-electric machine component comprising:
providing a wire lead manipulator having a longitudinal axis comprising first and second portions and configured to dispose a wire lead along the trajectory at the predetermined positional references, the predetermined positional references being located on a first plane substantially defined by a surface of the component;
receiving the wire lead from a wire lead source within a first portion of the wire lead manipulator;
engaging the wire lead received within the first portion with a second portion of the wire lead manipulator;
disposing the wire lead in the first plane at each of the predetermined positional references along the trajectory using a distal end of the wire lead manipulator that exclusively enters the first plane to accomplish relative movement of the distal end in the first plane with respect to the predetermined position references.

16. The method of claim 15 wherein disposing the wire lead in the first plane using a distal end of the wire lead manipulator comprises disposing the wire lead in the first plane using a terminal end of the second portion, wherein the first plane is substantially perpendicular to the longitudinal axis.

17. The method of claim 15 wherein receiving the wire lead further comprises receiving the wire lead within a hollow longitudinal member having a first opening configured for receiving the wire lead within the hollow member.

18. The method of claim 17 wherein engaging the wire lead further comprises engaging the wire lead with a rotatable sheath member disposed concentrically around the first portion and having a second opening for allowing the wire lead to pass into the first opening.

19. The method of claim 18 wherein engaging the wire lead further comprises rotating the sheath member to position the second opening out of alignment with the first opening.

20. The method of claim 18 wherein receiving the wire lead further comprises aligning the first and second openings with each other.

21. The method of claim 20 wherein receiving the wire lead further comprises aligning the first and second openings with the wire lead source to receive the wire lead into the first portion.

22. The method of claim 15 wherein receiving the wire lead further comprises positioning the wire lead manipulator adjacent a second plane from which the wire lead source dispenses the wire lead, the second plane being substantially parallel to the longitudinal axis.

23. The method of claim 22 wherein receiving the wire lead further comprises pressing the wire lead manipulator against a portion of the wire lead source.

24. The method of claim 15 further comprising providing the wire lead manipulator with relative rotation and substantially parallel translation with respect to a central axis of the dynamo-electric machine component that is substantially parallel to the longitudinal axis.

25. The method of claim 24 further comprising providing the wire lead manipulator with relative radial stratification with respect to the central axis.

26. The method of claim 25 further comprising disposing the dynamo-electric machine component on a table configured to provide rotation and radial stratification with respect to the central axis.

27. The method of claim 24 further comprising translating the wire lead manipulator along the longitudinal axis.

28. The method of claim 15 wherein receiving the wire lead further comprises receiving the wire lead from a wire dispensing needle configured to wind wire coils onto the dynamo-electric machine component.

* * * * *